R. W. BORNEMANN.
Covers for Slop-Jars, &c.
No. 227,091.　　　　　　　　Patented May 4, 1880.
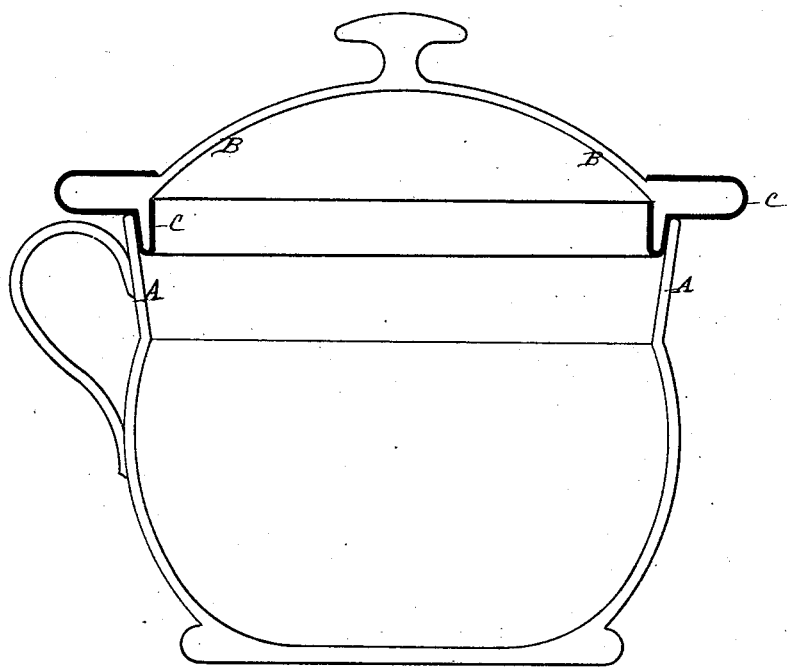
WITNESSES.　　　　　　　　INVENTOR.

UNITED STATES PATENT OFFICE.

RUDOLPH W. BORNEMANN, OF NEW YORK, N. Y.

COVER FOR SLOP-JARS, &c.

SPECIFICATION forming part of Letters Patent No. 227,091, dated May 4, 1880.

Application filed April 2, 1879.

*To all whom it may concern:*

Be it known that I, RUDOLPH W. BORNEMANN, of the city, county, and State of New York, have invented a new and useful Improvement in Covers of Slop-Jars, Chamber-Pots, and other Earthern Pots or Crocks, of which the following is a description in such full, clear, concise, and exact terms as will enable any one skilled in the art or science to which it appertains or with which it is most nearly connected to make and use the same, reference being had to the accompanying drawing, making part of this specification, and the letters of reference marked thereon.

My invention consists of an india-rubber facing applied to the faces and edges or ribs of the flange of the lid or cover of a crock or pot for the purpose of avoiding the noise made in putting the lid on the pot; to avoid the danger of breaking the edges of the lid or pot, and to make a tight joint between the two.

The invention is very simple, and will be readily understood by reference to the drawing, in which A is the pot, B the lid, and C the facing applied to the flange.

The rubber facing is made to cover all the edges or ribs of the flange around the lid of the pot, as well as its faces, so as to protect thoroughly all the edges and faces from striking against the top of the pot, as shown by the drawing. The rubber facing should be made in molds of the proper size and form, and stretched over the out edge of the cover or flange, and made to reach well up to keep it from coming off.

To secure the facing more firmly a rubber water-proof cement may be made and applied to the clean face of the flange of the lid before the facing is applied, which will secure it against the possibility of removal.

Having described my invention, I claim and desire to secure by Letters Patent—

An earthern or glass pot lid the flange of which is covered with india-rubber over its faces, edges, and ribs, to make a tight joint between the lid and pot, and to prevent the naked edges, ribs, or faces of the cover from coming in contact with the pot.

RUDOLPH W. BORNEMANN.

Witnesses:
AMOS BROADNAX,
H. C. HUDSON.